United States Patent
Collamore et al.

(10) Patent No.: US 7,188,246 B2
(45) Date of Patent: Mar. 6, 2007

(54) SYSTEM FOR ADDING ELECTRONIC SIGNATURE TO A REPORT ASSOCIATED WITH AN IMAGE FILE

(75) Inventors: Brian Collamore, Rutland, MA (US); Robert S. Arling, North Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 826 days.

(21) Appl. No.: 09/812,466

(22) Filed: Mar. 20, 2001

(65) Prior Publication Data

US 2002/0138731 A1    Sep. 26, 2002

(51) Int. Cl.
*H04L 9/00*    (2006.01)

(52) U.S. Cl. ...................................................... 713/176

(58) Field of Classification Search ................ 713/176, 713/201, 177, 178
See application file for complete search history.

(56) References Cited

U.S. PATENT DOCUMENTS

| 5,579,393 | A | * | 11/1996 | Conner et al. ............. 713/176 |
| 5,836,877 | A | * | 11/1998 | Zavislan .................... 600/407 |
| 5,867,821 | A | * | 2/1999 | Ballantyne et al. ............ 705/2 |
| 6,408,330 | B1 | * | 6/2002 | DeLaHuerga ............... 709/217 |
| 6,587,945 | B1 | * | 7/2003 | Pasieka ...................... 713/176 |
| 6,684,093 | B2 | * | 1/2004 | Kuth .......................... 600/407 |
| 6,816,842 | B1 | * | 11/2004 | Singh et al. .................. 705/59 |

OTHER PUBLICATIONS

Gritzalis et al., "Developing Secure Web-based Medical Applications", 1999, Medical Inforrmatics, 24(1): pp. 75-90.*

* cited by examiner

*Primary Examiner*—Matthew Smithers

(57) ABSTRACT

A system for adding an electronic signature chosen from a plurality of available electronic signatures to a report associated with an image file associates an electronic signature with a user of the system. When the user wishes to apply the electronic signature to the image file, or to a report associated with the image file, the user instructs the system to apply the electronic signature. The system can query the user of the system to determine whether the user is the individual that is currently logged on to the system. If the user is currently logged on, the system will apply that individual's electronic signature to the report associated with the image file. If the user is not the individual that is currently logged on, the system presents to the user a selection of electronic signatures, from which the user chooses the signature that identifies them as the user.

15 Claims, 4 Drawing Sheets

SYSTEM FOR ADDING ELECTRONIC SIGNATURE TO A REPORT ASSOCIATED WITH AN IMAGE FILE

TECHNICAL FIELD

The present invention relates generally to imaging systems, and, more particularly, to a system for determining the user of an image management system and applying an electronic signature to a report and associated image file stored on the image management system, where the electronic signature corresponds to one of a plurality of users of the system.

BACKGROUND OF THE INVENTION

Imaging systems, and ultrasonic imaging systems in particular, have been available for quite some time and are commonly used in nondestructive, and sometimes destructive, testing and medical applications. Medical ultrasound imaging typically allows the internal structure of the human body to be viewed non-invasively in real time. The ultrasound imaging system may be capable of various types of imaging applications, including, for example, one and two-dimensional imaging.

Typically, one imaging device may be used by a variety of different users and the images analyzed and interpreted by a number of different technicians and physicians. In some instances, a number of imaging devices may be interconnected via a network. For example, a number of imaging devices may be located throughout a single facility, such as a hospital or doctor's office. These imaging devices may be interconnected via a network, such as a local area network (LAN). Alternatively, two or more imaging devices located at different locations may be connected via a wide area network (WAN), such as the Internet.

In some applications a computer may be connected to the imaging device or to the network to which the imaging devices are connected. When connected to the imaging device (either directly or via some network) the computer may exchange diagnostic information with the imaging devices. For example, the imaging device may transfer the diagnostic image files to the computer. In such an arrangement, the computer may be considered a "server" because it may contain and store image files from any number of imaging devices and make those files available to a user of the server. The server may also include additional software that enables the server to manipulate the image files. A user may wish to access the image files located on the server so that a diagnosis may be made. The user may access the image files on the server either directly from the server, or may access the computer from another computer, commonly referred to as a "client," connected to the server either directly or via one of the above-described networks. When the server is accessed directly by a user, the server can be thought of as including the client application. In such an arrangement, the server is also considered the client.

Typically, the image file, any patient demographic data relating to the particular patient, and a report are combined in the server into what is referred to as a study. A user of the system, who wishes to review the image files, can access the study through the client application. Typically, the individual using the system is a sonographer or a physician. The user can access the study and the related image files and, after having analyzed the images, use the application software on the client to build a report, which will be sent to the physician who requested the diagnostic image. Peripheral data, such as measurements and diagnostic findings, may be added to the report. In some instances, a sonographer may develop a preliminary report, which can be saved and later reviewed by an attending physician. After the attending physician analyzes the report, the report is combined with the study, finalized and printed onto paper and then manually signed by the attended physician. The study is then conventionally mailed, or perhaps faxed, to the physician who requested the diagnostic image.

Unfortunately, printing and signing the report along with the image files and then mailing, or faxing, the report to the requesting physician is time consuming and prone to delay and error.

Therefore, it would be desirable to have an image management system that can automatically assign an electronic signature to the report and electronically forward the report to the requesting physician.

SUMMARY

The invention provides a system for adding an electronic signature chosen from a plurality of available electronic signatures to a report associated with an image file. Each of the plurality of electronic signatures is associated with a corresponding user of the system. When the user wishes to apply the electronic signature to the image file, or to a report associated with the image file, the user instructs the system to apply the electronic signature. The system can query the user of the system to determine whether the user is the individual that is currently logged on to the system. If the user is currently logged on, the system will apply that individual's electronic signature to the report associated with the image file. If the user is not the individual that is currently logged on, the system presents to the user a selection of electronic signatures, from which the user chooses the signature that identifies them as the user.

Other systems, methods, features, and advantages of the invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE INVENTION

The image management system of the invention can be implemented in hardware, software, firmware, or a combination thereof. In the preferred embodiment(s), the image management system is implemented using a combination of hardware and software or firmware that is stored in a memory and that is executed by a suitable instruction execution system. If implemented in hardware, as in an alternative embodiment, the image management system can be implemented with any or a combination of the following technologies, which are all well known in the art a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 1:
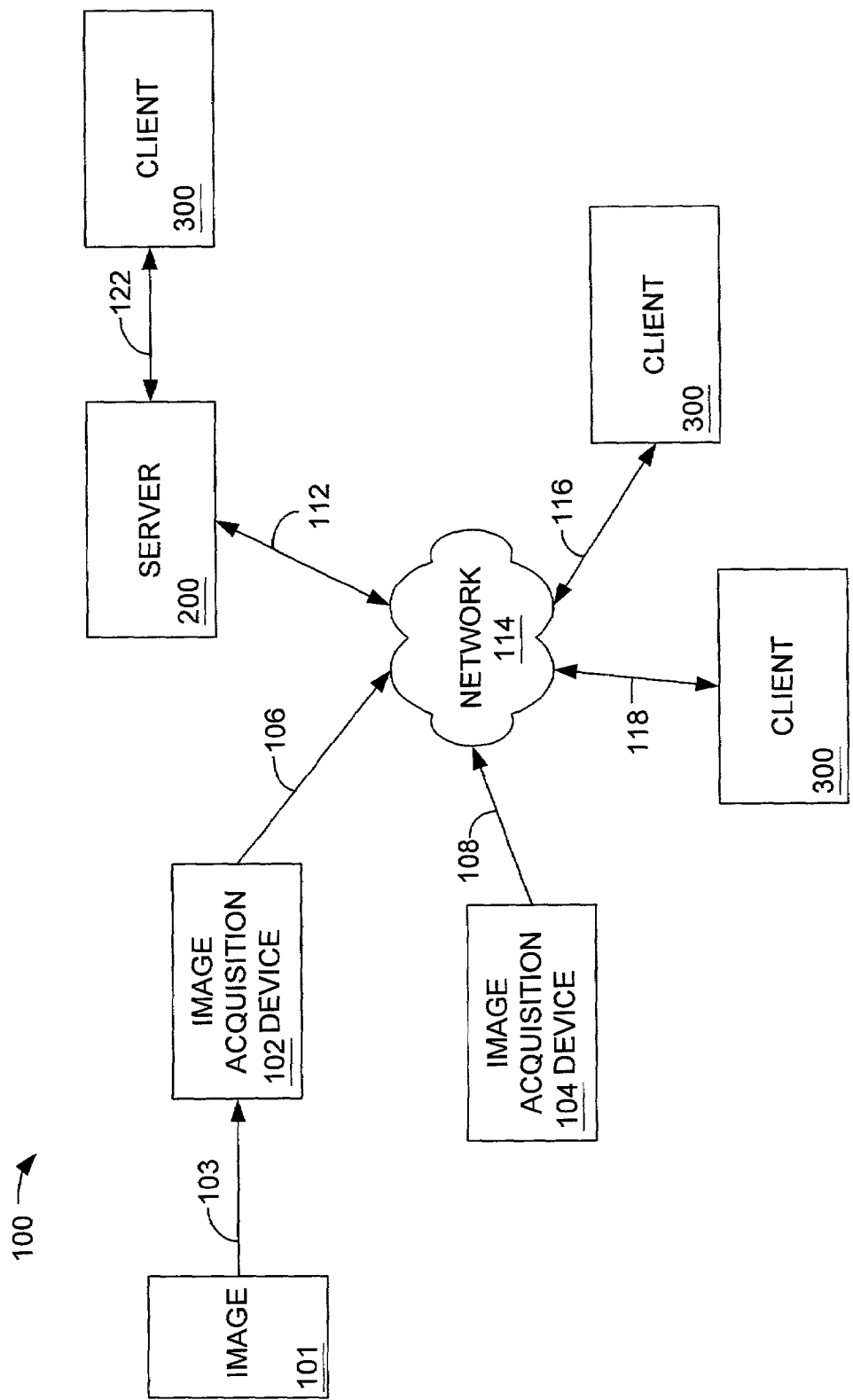
FIG. 1 is a graphical view illustrating an exemplar network environment in which the server including the image management system resides.

FIG. 1 is a graphical view illustrating an exemplar network environment 100 in which the server including the image management system resides. It should be noted that although illustrated in FIG. 1 as connected through a network, the image management system of the invention is not dependent upon the network connectivity described.

The network environment 100 includes at least one image acquisition device 102 connected to a network 114 via connection 106. The network environment 100 also includes an image acquisition device 104 connected to network 114 via connection 108. The image acquisition devices 102 and 104 can be any electronic devices capable of developing an electronic image 101, and in this embodiment, are ultrasonic diagnostic devices. The network 114 can be any local area network (LAN) or wide area network (WAN).

The network environment 100 also includes a server 200 connected to the network via connection 112, and a client 300 connected to the server 200 via connection 122. Alternatively, the client 300 may be included within the server 200 or may be connected to the network 114 via, for example, connections 116 and 118. Furthermore, more than one client 300 may be coupled to the server 200, either directly or via the network 114. As will be described in further detail with respect to FIGS. 2, 3 and 4, the server 200 includes an image management system that works in cooperation with a client application, which is part of the client 300, to add an electronic signature to an image file or a report associated with an image file. If the client 300 is contained within the server 200, then the client application will also be contained within the server 200. Furthermore, it is possible for the server 200 and the client 300 to be incorporated into the image acquisition device 102, in which case all of the functionality described herein is included in a single device.

Information can be exchanged over the network 114 using, for example transmission control protocol Internet protocol (TCP/IP) if the network is the Internet, or possibly an emerging communication standard referred to as Digital Imaging and Communications in Medicine (DICOM). DICOM can be used as the communication model for transferring the ultrasound data across the network 114.

In the currently contemplated best mode, the image management system is implemented in software and executed by a special or general purpose computer, such as a personal computer (PC; IBM-compatible, Apple-compatible, or otherwise), workstation, minicomputer, or mainframe computer. An example of a general purpose computer that can implement the image management system of the invention is shown below in FIG. 2.

Figure 2:
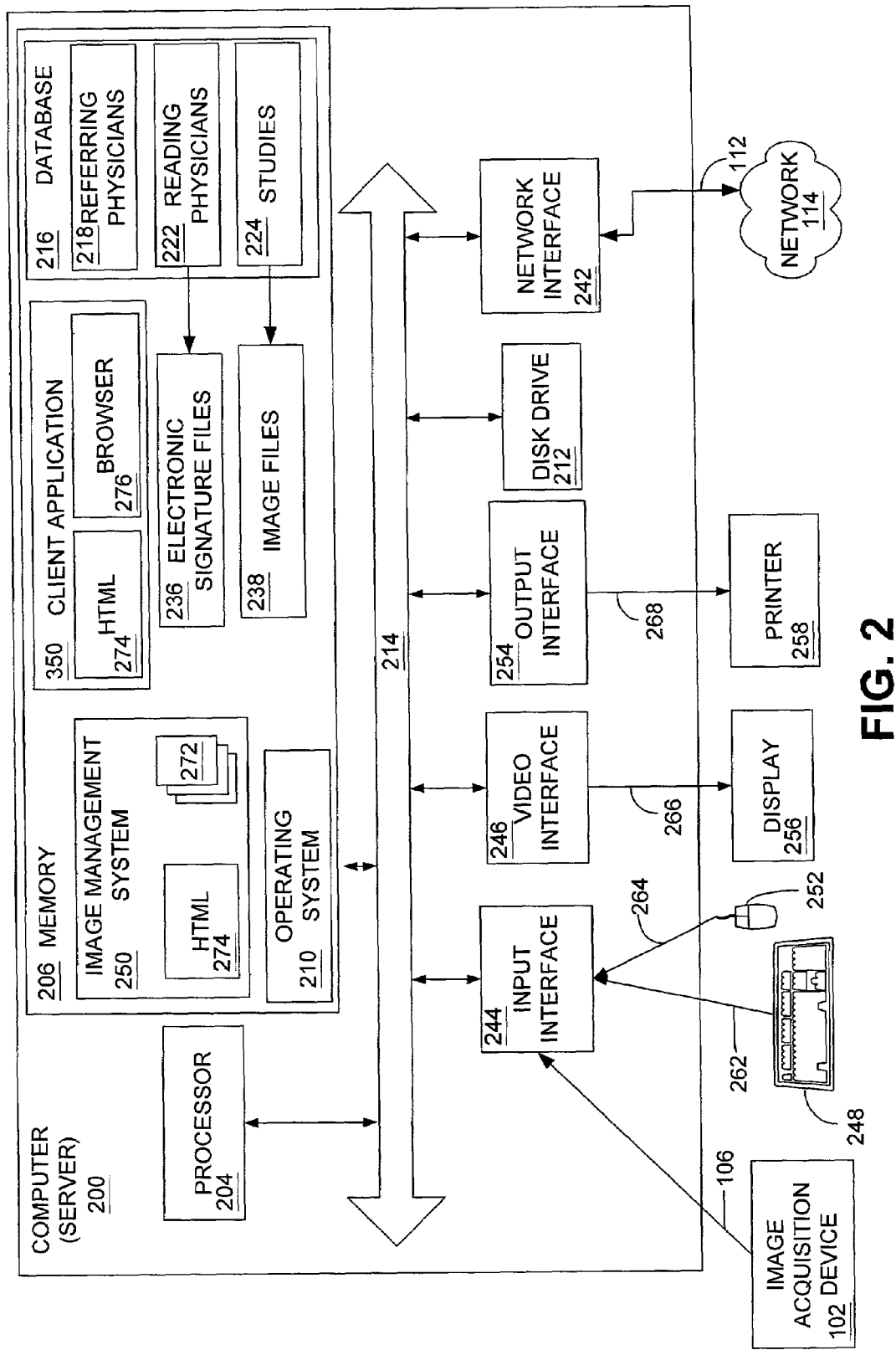
FIG. 2 is a schematic view illustrating the server of FIG. 1 in which the image management system resides.

FIG. 2 is a block diagram illustrating a computer 200 that includes the image management system 250 of the invention. The computer 200 can be a general purpose computer that can implement the image management system 250, and will be referred to as a server. Generally, in terms of hardware architecture, as shown in FIG. 2, the computer 202 includes a processor 204, a memory 206, a disk drive 212, an input interface 244, a video interface 246, an output interface 254, and a network interface 242 that are connected together and can communicate with each other via a local interface 214. The local interface 214 can be, for example but not limited to, one or more buses or other wired or wireless connections, as is known in the art. The local interface 214 may have additional elements, which are omitted for simplicity, such as buffers (caches), drivers, and controllers, to enable communications. Further, the local interface 214 includes address, control, and data connections to enable appropriate communications among the aforementioned components.

The processor 204 is a hardware device for executing software that can be stored in memory 206. The processor 204 can be any custom made or commercially available processor, a central processing unit (CPU) or an auxiliary processor among several processors associated with the computer 200, and a microchip based microprocessor or a microprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 206 can include any one or a combination of volatile memory elements (e.g., random access memory (RAM, such as DRAM, SRAM, etc.)) and nonvolatile memory elements (e.g., ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The input interface 144 can receive commands from, for example, keyboard 248 via connection 262 and from mouse 252 via connection 264 and transfer those commands over the local interface 214 to the processor 204 and the memory 206. The input interface 244 may also receive diagnostic images, in the form of image files, from image acquisition device 102 via connection 106. The image files may be stored in memory 206 as image files 238.

The video interface 246 supplies a video output signal via connection 266 to the display 256. The display 256 can be a conventional CRT based display device, or can be any other display device, such as a liquid crystal display (LCD) or other type of display.

The output interface 254 sends printer commands via connection 268 to the printer 258. The network interface 242 can be, for example, a network interface card that connects the computer 200 via connection 112 to a network 114, which in this case would be a LAN. Alternatively, the network interface 242 could be a modulator/demodulator (modem) or any communication device capable of connecting the computer 200 to a network 114, which in this example would be a WAN, such as the Internet.

The network interface may also be used to receive electronic image files from another image acquisition device connected to the network 114.

The software in memory 206 may include one or more separate programs, each of which comprises an ordered listing of executable instructions for implementing logical functions. In the example of FIG. 2, the software in the memory 206 includes the image management system 250, a client application 350 and a suitable operating system (O/S)

210. A nonexhaustive list of examples of suitable commercially available operating systems 210 is as follows: a Windows operating system from Microsoft Corporation, U.S.A., a Netware operating system available from Novell, Inc., U.S.A., or a UNIX operating system, which is available for purchase from many vendors, such as Sun Microsystems, Inc., U.S.A., Hewlett-Packard Company, U.S.A., and AT&T Corporation, U.S.A. The operating system 210 essentially controls the execution of other computer programs, such as the image management system 220 and the client application 350, and provides scheduling, input-output control, file and data management, memory management, and communication control and related services. Preferably, the operating system 210, the image management system 250 and the client application 350 are Windows NT elements.

The processor 204 and operating system 210 define a computer platform, for which application programs, such as the image management system 250 and the client application 350, are written in higher level programming languages. The client application 350 also provides the user interface through which a user of the system communicates with the computer 200 and the image management system 250. The user interface component of the client application uses, for example, the keyboard 248 and mouse 252 to provide input to the computer 200 and uses the display 256 to provide output.

If the computer 200 is a PC, the software in the memory 206 further includes a basic input output system (BIOS) (omitted for simplicity). The BIOS is a set of essential software routines that test hardware at startup, start the O/S 210, and support the transfer of data among the hardware devices. The BIOS is stored in ROM so that it can be executed when the computer 200 is activated.

When the computer 200 is in operation, the processor 204 is configured to execute software stored within the memory 206, to communicate data to and from the memory 206, and to generally control operations of the computer 200 pursuant to the software. The image management system 250, client application 350 and the O/S 210, in whole or in part, but typically the latter, are read by the processor 204, perhaps buffered within the processor 204, and then executed.

The memory 206 includes a plurality of electronic signature files maintained in element 236. Each electronic signature file includes a digitized image of a signature corresponding to each of the users of the image management system who may be required to sign a report 272 generated by the image management system 250. The signatures contained in the electronic signature file element 236 may be electronically scanned and stored as, for example, joint photographic experts group (JPEG, file extension jpg), graphics interchange format (GIF, file extension gif) or another file format that is compatible with the computer 200 and the client application 350.

The memory also includes a database 216. The database 216 can be implemented using, for example, Microsoft SQLServer, and includes a referring physician list 218, a reading physician list 222 and a study list 224. Other database implementations, and alternatives to database implementations, such as indexed sequential access method (ISAM) tree implementations and file systems, as known to those having ordinary skill in the art, are possible. The reading physician list 222 is electronically linked to the electronic signature file 236 so that the files contained in the electronic signature file element 236 correspond to the physicians (reading physicians) that are expected to use the system. Typically, a system administrator accesses a tool (not shown) that allows the system administrator to correlate electronic signature files with system users. It is also possible to have a user that has no associated electronic signature file. In such a case, the system does not include the electronic signature file in the report 272, thus providing backward compatibility with a traditional use model.

The study list 224 is electronically linked to the image files 238. The studies contained in the study list 224 include the image file, any patient demographic data relating to the particular patient, and a report 272.

The database includes the referring physicians list 218 so that after an electronic signature is applied to the appropriate report 272 associated with one of the image files 238 and study 224, the study can be electronically transferred to the physician that requested the analysis (the referring physician). The study can be electronically transferred to the referring physician using, for example, email or fax, through the network interface 242. Alternatively, the report 272 can be published to the Internet for the referring physician to access using a security password.

Once an electronic image file is made available to the image management system 250, the image management system 250 can associate each of the image files 238 with the appropriate study 224 and present the image files and the study in the form of a report 272 to a user of the system 250. In addition to providing the user interface into the computer 200, the client application 350 may also include additional functionality, such as a measurements package, which allows the user of the system to append measurements to the image file, or a diagnostics package, which allows a user to append diagnostic findings to the image file.

When the image management system 250 is implemented in software, as is shown in FIG. 2, it should be noted that the image management system 250 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The image management system 250 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the image management system 250 is implemented in hardware, the image management system 250 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 3:
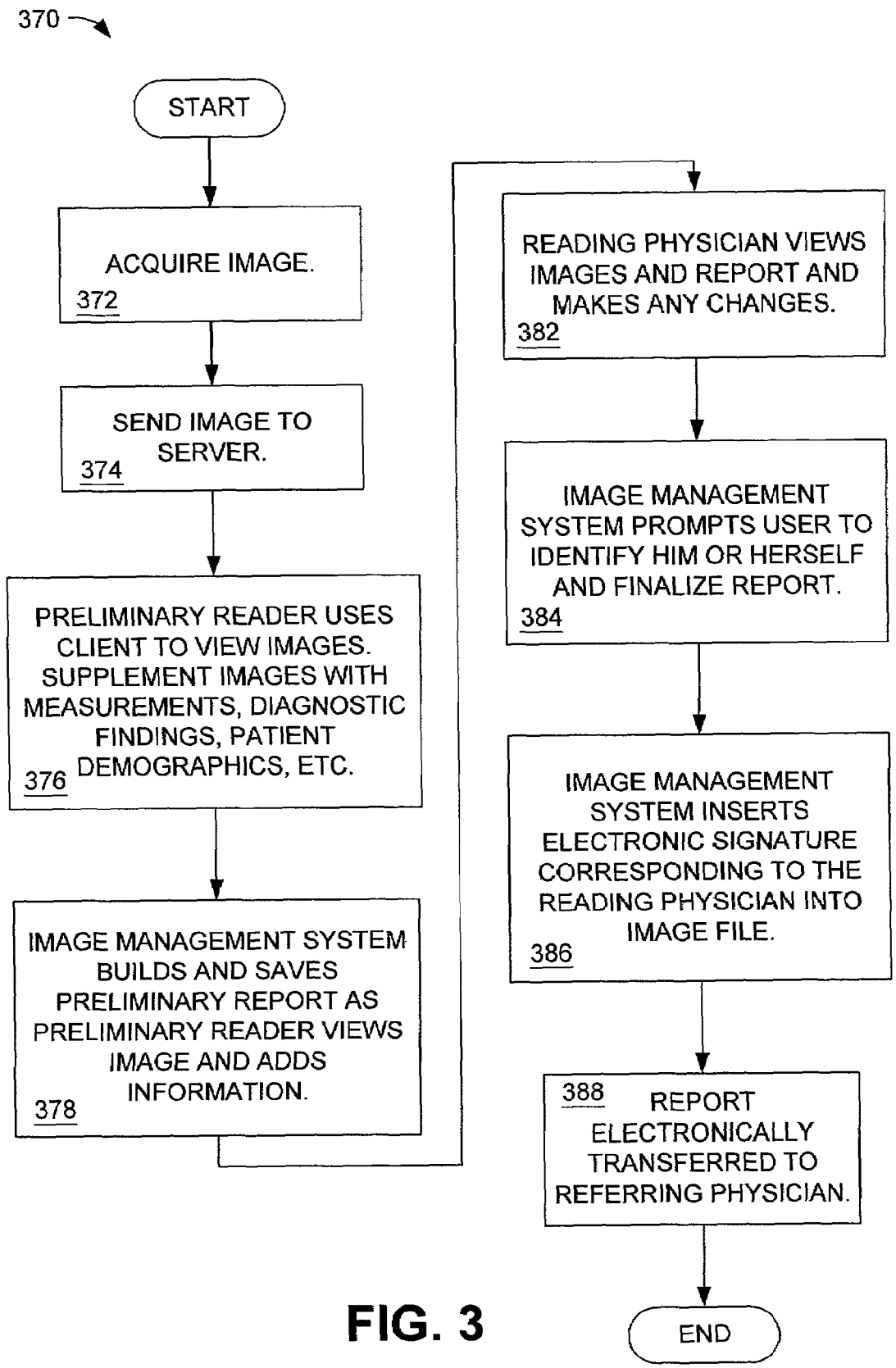
FIG. 3 is a flow diagram illustrating the operation of one embodiment of the image management system of FIG. 2.
Figure 4:
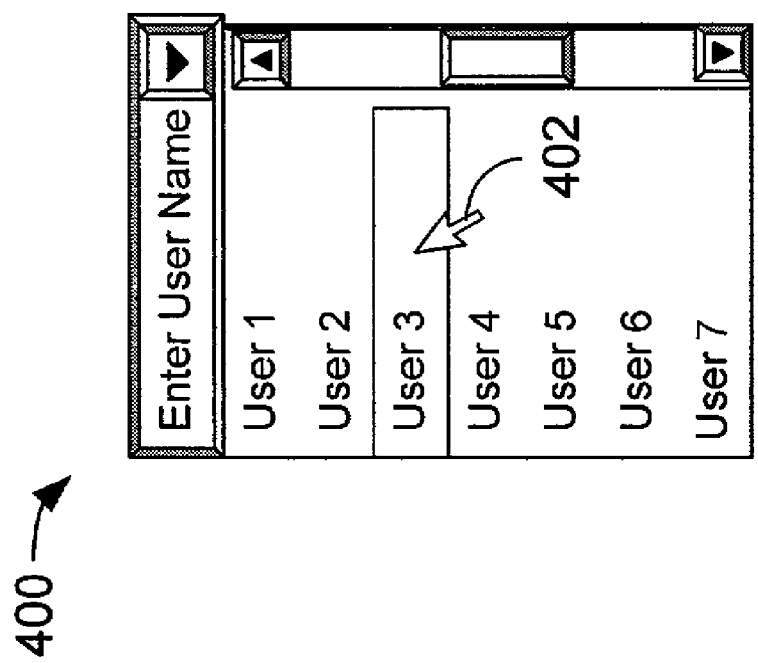
FIG. 4 is a graphical view illustrating an exemplar user interface of the image management system of FIG. 2.

FIG. 3 is a flow diagram 370 illustrating the operation of one embodiment of the image management system 250 of FIG. 2. In block 372 an image is acquired on one of the image acquisition devices of FIG. 1. For example, if the image acquisition device is a diagnostic ultrasonic imaging device, then in block 372 a sonographer might acquire an ultrasonic diagnostic image (101 of FIG. 1) on the image acquisition device 102 of FIGS. 1 and 2.

In block 374 the acquired diagnostic image is sent to the server 200. If the image acquisition device 102 is connected directly to the server 200 via connection 106 as illustrated in FIG. 2, then the image acquisition device 102 directly supplies the image files representing the ultrasonic diagnostic image in electronic format to the input interface 244 of the server 200. The diagnostic image is then forwarded via the local interface 214 to the processor 204 and memory 206 of the server 200 of FIG. 2 where it is stored as image file 238. If the image acquisition device is connected to the server 200 via the network 114, then the diagnostic image is forwarded over the network to the network interface 242 of the server 200. The diagnostic image is then forwarded via the local interface 214 to the processor 204 and the memory 206 of the server 200 of FIG. 2. Regardless of the manner in which the diagnostic image is forwarded to the server 200, the diagnostic image is stored as the image file 238 in the memory 206.

In block 376, a user of the image management system 250 accesses the server 200 using the client application 350. The user could also access the server using a client (FIG. 1) having the client application 350. In block 376 it is assumed that the user is a preliminary reader of the image file 238. The preliminary reader, who may be, for example, a sonographer, may wish to access the image file 238 to perform a preliminary analysis of the diagnostic image. During the analysis, the preliminary reader may wish to supplement one or more image files 238 with measurements, diagnostic findings, or patient demographic information. All of this information is contained within the memory 206 and made available through the client application 350. The client application 350 works in cooperation with the keyboard 248 and the mouse 252 to supply inputs to the server 200 and uses the display 256 to display outputs to the user.

In block 378, while the preliminary reader analyzes the image files 238, the image management system 250 builds a preliminary report 272. The report 272 may be developed using hypertext markup language (HTML) element 274, so as to be compatible with Internet browser programs, and may include the diagnostic images and any appended information, such as measurements, diagnostic findings, patient demographics, etc. Typically, a web browser 276, such as Microsoft's Internet Explorer, is embedded into the client application 350. The report 272 is generated using HTML, which is accessed when needed by the client application 350. When the reading physician finalizes the report, the client application 350 builds the HTML that adds the appropriate digitized signature, and instructs the web browser 276 to render the HTML document. As the preliminary reader appends such information to the image file 238, all such information is saved in the memory 206 of the server 200. This information combined with the image files 238 is saved in the studies list 224 as a study.

In block 382 another user of the system, in this case a reading physician responsible for verifying the diagnosis of the diagnostic image, may log into the server 200 via the client application 350 and access the subject study, which was previously saved, from the study list 224. The reading physician may make any necessary additions, and/or changes to the study, and then finalize the report 272. This can be accomplished using a password for security purposes.

In block 384, through the client application 350, the reading physician is presented with an option to finalize the report 272. In addition, the reading physician is prompted by the client application 350 with a query window, such as the query window 400 shown in FIG. 4. The query window 400 is presented to the reading physician by the image management system 250 so that the reading physician may identify himself or herself to the image management system 250. This step takes into consideration the situation where the reading physician may not be the individual that originally logged into the image management system 250. For example, the preliminary reader mentioned above may have logged into the image management system and not logged out, leaving the study available for the reading physician to review. The system queries the user who requests the final report 272 so that the identity of the user (the reading physician in this example) can be communicated to the image management system 250. Using the pointer 402 shown in FIG. 4, the user communicates his or her identity to the image management system 250. The list of users (in this example, the reading physicians) is stored in the memory 206 as the reading physician list 222. The reading physician list 222 is presented to a user (using the user interface shown in FIG. 4), so that the reading physician may identify him or herself to the system. The user may also be requested to enter a password to authenticate his or her identity.

Each reading physician in the reading physician list 222 has an associated electronic signature file 236. If a reading physician does not have an associated electronic signature, the system does not include an electronic signature in the report 272, thus providing backward compatibility with the traditional use model. The electronic signature file 236 associated with each reading physician corresponds to a scanned image of the signature of the reading physician.

In block 386, and after the user identifies him or herself to the image management system 250 in block 384, the image management system 250 electronically inserts into the report 272 an electronic signature corresponding to the reading physician if an electronic signature exists for the reading physician. Further, it is possible to amend a report 272. In such a case, when the modifications to the report 272 are saved, another report is generated, possibly with a new electronic signature.

In block 388 the report 272 is then saved and can optionally be electronically transferred, via the network interface 242 (FIG. 2), to, for example, the referring physician. The referring physician is the individual who individually requested the diagnostic image. A list of referring physicians is maintained in the memory 206 of server 200 as the referring physician's list 218. The referring physician's list 218 may include, for example, an electronic mail (email) address or facsimile (fax) number of each of the referring physicians. In this manner, the reading physician can quickly and accurately electronically apply his or her signature to the report 272, and then have the report 272 electronically forwarded to the referring physician. This eliminates the necessity of printing the final report 272, and then manually signing the report 272 and having the report 272 mailed conventionally, or manually faxed to the referring physician.

It will be apparent to those skilled in the art that many modifications and variations may be made to the preferred embodiments of the present invention, as set forth above, without departing substantially from the principles of the present invention. For example, the present invention can be used in any ultrasound imaging system. All such modifications and variations are intended to be included herein within the scope of the present invention, as defined in the claims that follow.

What is claimed is:

1. An image management system, comprising:
    an image acquisition device, comprising an ultrasound diagnostic device;
    a computer coupled to the image acquisition device, the computer including logic for receiving a diagnostic image from the image acquisition device; and
    a memory element associated with the computer, where the memory element stores a plurality of electronic signature files; wherein the computer includes logic for associating one of the plurality of electronic signature files with the diagnostic image and the electronic signature file is associated with the diagnostic image only after the entry of a password.

2. The image management system of claim 1, wherein each of the plurality of electronic signature files corresponds to a signature of a user of the image management system.

3. The image management system of claim 2, further comprising a client application associated with the computer, where the client application instructs the computer to associate one of the plurality of electronic signature files with the diagnostic image.

4. The image management system of claim 3, wherein the client application further comprises:
    a user interface configured to present to the user of the image management system a plurality of choices from which the user identifies him or herself as the user of the image management system so that the electronic signature file associated with the diagnostic image corresponds to the user of the image management system.

5. The image management system of claim 1, further comprising:
    a network configured to couple the image acquisition device to the computer; and
    a network interface associated with the image acquisition device and the computer, the network interface configured to electronically transfer the diagnostic image over the network.

6. A method for applying an electronic signature to a report associated with an image file, the method comprising the steps of:
    acquiring an ultrasonic diagnostic image from an ultrasound diagnostic device;
    forwarding the diagnostic image to a computer;
    storing a plurality of electronic signature files in a memory associated with a computer;
    associating one of the plurality of electronic signature files with the diagnostic image; and
    requiring a password prior to associating one of the plurality of electronic signature files with the diagnostic image.

7. The method of claim 5, wherein each of the plurality of electronic signature files corresponds to a signature of a user of the computer.

8. The method of claim 6, further comprising the step of using a client application to instruct the computer to associate one of the plurality of electronic signature files with the diagnostic image.

9. The method of claim 8, further comprising the step of presenting to a user of the image management system a plurality of choices from which the user identifies him or herself as the user of the image management system so that the electronic signature file associated with the diagnostic image corresponds to the user of the image management system.

10. The method of claim 6, further comprising the steps of:
    coupling the image acquisition device to the computer system over a network; and
    electronically transferring the diagnostic image over the network.

11. In an image management system, a computer readable medium having a program for applying an electronic signature to a report associated with an image file, the program comprising logic for performing the steps of:
    receiving an ultrasonic diagnostic image from an ultrasonic image acquisition device;
    forwarding the diagnostic image to a computer system;
    storing a plurality of electronic signature files in a memory associated with a computer;
    associating one of the plurality of electronic signature files with the diagnostic image; and
    requiring a password prior to associating one of the plurality of electronic signature files with the diagnostic image.

12. The program of claim 11, wherein each of the plurality of electronic signature files corresponds to a signature of a user of the image management system.

13. The program of claim 12, further comprising logic for allowing a client application to instruct the computer to associate one of the plurality of electronic signature files with the diagnostic image.

14. The program of claim 13, further comprising logic for presenting to a user of the image management system a plurality of choices from which the user identifies him or herself as the user of the image management system so that the electronic signature file associated with the diagnostic image corresponds to the user of the image management system.

15. The program of claim 11, further comprising logic for:
    coupling the image acquisition device to the computer system over a network; and
    electronically transferring the diagnostic image over the network.

* * * * *